United States Patent [19]

Kock et al.

[11] Patent Number: 4,824,600

[45] Date of Patent: Apr. 25, 1989

[54] PREPARATION OF A SUSPENSION IN PREPARATION OF POWDER MAKING

[75] Inventors: Wulf Kock, Markdorf; Wolfgang Wagner, Deggenhauser Tal, both of Fed. Rep. of Germany

[73] Assignee: Dornier System GmbH, Friedrichshafen, Fed. Rep. of Germany

[21] Appl. No.: 67,469

[22] Filed: Jun. 26, 1987

[30] Foreign Application Priority Data

Jun. 26, 1986 [DE] Fed. Rep. of Germany ....... 3621398

[51] Int. Cl.$^4$ ............................ B22F 9/30; C22C 1/04
[52] U.S. Cl. .............................. 252/313.1; 75/0.5 A; 75/118 R; 423/95; 423/395
[58] Field of Search ........................... 252/313.1 APS; 106/1.14; 75/118 R, 0.5 A; 423/95, 395, 397

[56] References Cited

U.S. PATENT DOCUMENTS 4,150,982   4/1979   Shibata ................................. 148/431
4,396,420   8/1983   Schmidberger et al. ....... 75/0.5 CX

FOREIGN PATENT DOCUMENTS 2929630   7/1979   Fed. Rep. of Germany .

Primary Examiner—Herbert B. Guynn
Assistant Examiner—Gary Geist
Attorney, Agent, or Firm—Ralf H. Siegemund

[57] ABSTRACT

A highly concentrated silver salt suspension and tin salt suspension from which a silver and tin oxide powder can be made under utilization of the reaction spray method is made by adding in small steps a tin II salt solution into a small volume of concentrated nitric acid while maintaining a temperature below 40 degrees C. to obtain an injection suspension of a tin II salt solution, the injection suspension is then mixed with about a three fold quantity (volume) of concentrated 65% nitric acid, the latter mixture is then added in small steps to a watery citrate solution and combined with tin granules until all tin granules are dissolved and changed into a tin IV oxide hydrate suspension; the completed tin IV oxide hydrate suspension as per the preceding step is mixed with a watery silver nitrate solution.

18 Claims, No Drawings

PREPARATION OF A SUSPENSION IN PREPARATION OF POWDER MAKING

BACKGROUND OF THE INVENTION

The present invention relates to a method of making a highly concentrated water containing suspension containing silver salt and tin salt. More particularly the invention relates to a method for making such a high concentrated suspension of silver salt and tin salt in water from which compound powder that includes silver and tin oxide can be made under utilization of reaction spraying. German Pat. No. 2,929,630 discloses a reaction spray production method of silver powder wherein the powder has a composition Ag/CdO and is to be used for making electrical contacts. The powder particles are made by spraying a watery solution of silver salt and Cadmium salt into a hot reactor, and the resulting particles, after the reaction, are separated from the hot gas flow in a centrifugal separator and precipitator and are collected separately.

DESCRIPTION OF THE INVENTION

It is an object of the present invention to provide a new and improved method by means of which highly concentrated and highly dispersed blends and mixtures of silver compounds and tin compounds can be produced, particularly for purposes of utilization as charge in a reaction spraying process fine distribution of the solution through a single or two component nozzle so as to make a compound powder that includes metallic Ag and tin oxide.

It is therefore a specific object of the present invention to provide a new and improved method of making a highly concentrated watery silver salt and tin salt containing suspension for use in making a compound powder which includes metallic silver and tin oxide through reaction spraying.

In accordance with the preferred embodiment of the present invention, it is suggested to provide the following steps. First, an injection suspension of a tin II salt solution is made through metered injection of the tin salt into a rather small volume of concentrated nitric acid and including the step of maintaining the solution and suspension thus made at a temperature below 35 degrees C. Subsequently this injection suspension is mixed with the three-fold volume of concentrated 65% nitric acid and this mixture is in steps and in a metered fracural fashion added to a watery citrate solution contained in a vessel together with tin granules until all tin has dissolved and converted into a tin IV hydrate suspension; then this completed, tin IV oxide hydrate suspension is combined with a watery silver nitrate solution.

The injection suspension is preferably made of a tin II salt solution being a watery solution of nitric acid and acetic acid into which tin powder is poured while the solution is stirred; the tin powder is added at such a low temperature that a further oxidation of tin II salt to a tin IV compound is avoided. The mol ratio of acetic acid to nitric acid is between 5:1 and 1:2, preferably 2:1. Any passivating layer on the surface of the tin powder granules is cracked directly in that prior to adding the tin granules they are ground or the like, perfectly in a cross beater mill. The tin powder is added at a temperature of not more than 25 degrees C; any solution residue are removed through centrifugal forces or overflow.

The tin II salt solution for making the injection suspension should contain 70 grams of tin ions per liter solution. Per liter tin II solution one will use 22 ml 65% nitric acid. The citrate solution should contain 10% citric acid hydrate. The mass ratio of the tin granules to the citric acid-1-hydrate is between 10:1 and 3:1; preferably about 6:1. The adding of the mixture that includes the injection suspension and nitric acid, to the tin granules will be carried out preferably at a temperature at about 40 degrees C. The tin IV oxide hydrate suspension should, prior to being combined with the silver nitrate solution, have a concentration of 1.66 mol tin/liter.

In an alternate procedure, the tin II salt solution may be combined directly with the watery silver nitrate solution without prior conversion into a suspension. The tin II salt solution has a concentration of not more than 0.6 mol tin/liter prior to combining with the silver nitrate solution. The silver nitrate solution may have been made by dissolving silver granules in a 50% nitric acid at 80 degrees uses a mol ratio of nitric acid to silver of about 1.4:1.

For economic reasons only inorganic compounds (salts) will be used as stationary products if a compound powder with a high silver content is to be made such as is needed for electrical contact materials, adequately high concentration solutions can be made for practical purposes only from silver nitrate. The silver nitrate can be used directly as a salt or as metal granules of silver and nitric acid. Silver ions have the tendency to precipitate together with a large variety of anions and being difficult to dissolve in a solvent. Hence only those tin compounds can be used whose anions at the chosen concentrations together with the silver ions will not excede solubility of the respective silver salt nor will it (the tin compound) disassociate to any significant extent into ions. In the case of tin compounds where tin is used as two valued composition one has to consider that no redox reaction occurs between the $Sn^{2+}$ ions and the $Ag^+$ ions under formation of elemental silver and tin (IV) compounds.

On the basis of the position of the redox potential a redox reaction can be avoided only at a very low concentration of the redox partner. These low concentrations are attained either by using a small amount of salt material or through the formation of complex compounds, at least of one of the types of ions participating in the redox reaction. The complex formation of Ag ions can occur through silver diamino-dicyano or-dithiosuphate complexes. Such complexes will not however attain a sufficiently high silver concentration as compared with the very well solvable silver nitrate. Known and cutomary complexes for the II-valued tin as well as for the four valued tin are e.g. chlorine-complexes or hydroxide complexes. Those two kinds of complexes cannot be used in the presence of silver for obvious reasons. On theother hand the stability of acetate complexes of the two valued tin in conjunction with the moderate solubility of silver acetate permits utilization of these complexes as inorganic tin compounds. Tin acetate can be made from tin powder and acetic acid in the presence of a sufficient quantity of a strong acid with a pk value <1.5 provided it is present in adequate concentration. Also, those mineral acids are suitable wich will not form precipitation products with silver ions that dissolve with difficulties suitable here is nitric acid or carboxylic acid e.g. di- or tri-chloric acetic acid.

The utilization of an oxidizing acid such as nitric acid presupposes that certain limits on concentration and temperature are maintained so that further oxidation of any II valued tin oxide to IV valued tin oxide is avoided. The nitric acid concentration should not be more than 3 mols and the temperature should not exceed, at least not significantly, ordinary room temperature, in order to avoid further (continued) oxidation of the II valued tin.

Certain difficulties arise that owing to the (exothermic) oxidation the solution heats up even if the maximum limits concerning temperature and/or concentration are excluded for a short period of time only, this will lead to a spontaneous reaction of the entire solution. Since heating has to be avoided during the dissolving of the tin power the solving process can be impeded by the above mentioned passivation layer. Dissolving can be imitated in this case if just prior to using the tin powder it is ground is cross beater mill or the like.

Upon using a tin acetate complex one can provide a tin solution which has a 0.5 molar content as far as the tin is concerned. Depending on the desired ratio of silver to tin one obtains highly concentrated sprayable compounds for the making of a compound powder of silver and tin dioxide, the powder making being a reaction type spraying process. Here one is able to provide per liter atomizable material about 400 grams cmpound powder with a composition of 90% by weight silver and 10% by weight tin dioxide. This material will go into solution at very low concentration only. In the case of higher concentration requiring for example 50 grams powder or more per liter then as the silver and tin solutions combine certain intermediate steps occur ending into formation of a very stable suspension and the solution turns black. If the material has a higher powder yield per liter one cannot use the route through tin II acetate since after a short period of rest the material will precipitate, and from the combined silver and tin solutions a white precipitation will deposit on the respective vessel.

In the case of higher concentration one needs a suspension wherein the tin is used in a IV valued state. In the case of a small volume of concentrated nitric acid, and if one keeps the temperature at about 40 degrees C, then one obtains a very finely dispersed suspension of pure white tin oxide hydrate. If a temperature of 40 degrees is exceeded the suspension turns grays and can no longer be used for powder making by reaction spraying.

As stated above the suspension is produced by pouring tin II acetate solution into nitric acid. The suspension is particularly used as injection suspension during the making of additional tin oxide hydrate. Without the injection suspension the following procedure will produce a dissolution without formation of a suspension. However, after an induction period of about 5 to 10 minutes a gray white precipitation forms spontaneously under development of a large amount of heat. This precipitation gels the entire material so that owing to the continuous spray development of heat sputtering occurs in an undesired fashion under heavy formation of bubbles. On the other hand the presence of injection suspension insures that immediately a white suspension forms while any spontaneous, suddenly occuring strong exothermic reaction and any gel formation will not occur provided, however, the temperature will not exceed 40 degrees C. In case the reaction temperature is too high then even in the case of a suspension one will observe a spontaneous exothermic reaction in conjunction with the formation of a gel.

The presence of citric acid makes sure that the suspension is particularly finely divided. This way one obtains a suspension that can be atomized into a very fine foglike distribution of droplets. Through adding the suspension to a silver nitrate solution of higher concentration one obtains the two following results. First, the sedimentation of the suspended particles is slowed down owing to the high density (=2) of the silver nitrate solution. Second, the silver solution penetrates into the rather loose structure of the tin oxide hydrate particles and causes a natural penetration of the two components such that the elemental distribution becomes noticeably finer than in the case of a suspension of just tin dioxide particles in a silver nitrate solution. Suspensions made in accordance with the inventive method obtain a yield per liter of 690 grams compound powder at a composition of 90% by weight silver and 10% by weight tin dioxide.

EXAMPLE 1

(a) In a 2 liter glass container, flask, retort etc. 900 g silver granules are combined with 245 ml demineralized water. The content is heated to 80 degrees C. Under stirring 65% nitric acid is slowly added, drop by drop, at a total quantity of 770 ml. Following this very fractual addition the silver granules are stirred until all have dissolved. The solution is then maintained at a particular temperature until combining it with a tin oxide suspension to be made as will be described next.

(b) A tin oxide suspension is prepared first through an injection suspension, 200 ml demineralized water is mixed 160 ml 90% acetic acid and 80 ml 65% nitric acid. This blend is cooled to 10 degrees C. 31 grams tin powder are added to this blend while the mixer is strongly stirred. The tin powder is not added at once but in small portions. Tin powder owing to its rather strong passivated surface layer either does not dissolve at all or very slowly, so that just prior to adding the tin it is ground in a cross beater mill for about one minute. Following the adding of tin powder the temperature of the solution has probably increased to about 20 degrees and has a yellow greenish color. The solution is now slowly, drop by drop, added to 10 ml 65% nitric acid while the latter is stirred strongly and the reaction temperature should not exceed 35 degrees C. Following this adding a pure white suspension obtains which is used as an injection suspension for the manufacture of a still higher concentrated tin oxide suspension. This high concentrated suspension is produced in that a blend of 125 ml water is combined with 13 g citric acid -1-hydrate and 74.6 g tin granules. In addition 60 ml of the previously described injection suspension is drop by drop added to 200 ml 65% nitric acid. The combining is metered such that the temperature would not exceed 40 degrees C dissolved. Stirring has to be appropriately vigorous and the procedure lasts about 6 hours.

(c) In a final step, the thus made tin oxide suspension (step (b)) is then combined with the warm silver nitrate solution.

The resulting solution now contains, per liter, silver compounds and tin compounds for about 690 g powder at a consistency of (metallic) silver to tin dioxide in weight units 9 to 1. In order to avoid decomposition and mixing during working particularly during reaction spraying one needs to stir the suspension.

EXAMPLE 2

44.9 g silver nitrate corresponding to a silver quantity of 28.5 g are dissolved in demineralized water at a total volume to about 540 ml. In addition a tin salt solution is prepared in that 2.5 g tin powder is dissolved in a blend of 146.8 ml demineralized water, 73.5 ml 96% acetic acid and 37.7 ml 65% nitric acid. In the case of a strong passivation layer on the tin powder particles one has a grind again the tin powder for about 1 minute in a cross beater mill. Following the dissolution the silver nitrate solution is combined with the tin solution and a clear solution results which per liter contains silver salt and tin salt for 40 g powder, again at a silver to tin dioxide weight ratio of 9:1.

EXAMPLE 3

The same amount of solution medium is described in example 2 is made but with a 10 fold higher metal concentration so that 449.8 g silver nitrate has to be solved to obtain up to 540 ml solution. The tin solution is provided by adding 25 g of tin powder to a blend of 1460.8 ml water, 73.5 ml 96% acetic acid and 37.7 ml 65% nitric acid. Again, if necessary, the tin powder is ground for one minute in a cross beater mill. It is absolutely necessary to add the tin powder in such small portions that the temperature definitely remains under 25 degrees C. Following the completion of adding the tin powder one will stir the blend for half an hour until the reaction is completed and the solution has a yellow greenish color. The tin salt solution is now dropped into the silver nitrate solution under strong stirring. Instead of drop by drop adding one may use a very small and thin pouring steam. During mixing the two solutions together the color will change colorless to light green to brown to black whereby still during a brown coloration the solution can be deemed clear. A solid black color is then a reliable index or indication for completed suspension, which can be sprayed and is characterized by very finely divided particles and is quite stable.

The invention is not limited to the embodiments described above but all changes and modifications thereof, not constituting departures from the spirit and scope of the invention, are intended to be included.

We claim:

1. Method for making a highly concentrated watery suspension containing silver and tin salts from which a silver (metallic) and tin oxide powder can be made under utilization of the reaction spray method comprising the steps of:
    providing an injection suspension of a tin II salt solution by adding, in small steps a tin II salt solution into a small volume concentrated nitric acid while maintaining a temperature below 35 degrees C;
    mixing the injection suspension with about a three fold quantity (volume) of concentrated 65% nitric acid;
    adding the latter mixture in small steps to a watery citrate solution combined with tin granules, until all tin granules are dissolved and changed into a tin IV oxide hydrate suspension; and
    combining the completed tin IV oxide hydrate suspension as per the preceding step with a water silver nitrate solution.

2. Method as in claim 1 and including the step of providing the tin II salt solution by adding the tin powder in small portions to a watery solution of nitric acid and acetic acid, at a low temperature to avoid any continued oxidation of the tin salts into tin IV compounds.

3. Method as in claim 2 wherein the mol ratio of acetic acid to nitric acid is in a range between 5:1 and 2:1.

4. Method as in claim 3 said ratio being 2:1.

5. Method as in claim 2 including the steps of grinding the tin powder if the granules carry a passivating layer.

6. Method as in claim 2 said tin powder is added at a temperature not exceeding 25 degrees C.

7. Method as in claim 2 including the step of removing solvent residue.

8. Method as in claim 1 wherein the tin II salt solution has about 70 g tin ions/liter solution.

9. Method as in claim 8, combining said tin II solution with the 65% nitric acid at a ratio of 1 liter tin solution to 22 ml nitric acid.

10. Method as in claim 1 said citrate solution including 10% citric acid hydrate.

11. Method as in claim 10 wherein the mass ratio of the tin granules to the citric acid -1-hydrate is between 10:1 and 3:1.

12. Method as in claim 11 said ratio being 6:1.

13. Method as in claim 1 wherein the mixture of injection suspension and nitric acid is added to the tin granules at a temperature between about 30 degrees C and about 40 degrees C.

14. Method as in claim 13 said temperature being 40 degrees.

15. Method as in claim 1 the tin IV oxide hydrate suspension, prior to being combined with the silver nitrate solution, having a concentration of 1.66 mol tin/liter solution.

16. Method as in claim 1 wherein the tin II salt solution is combined without prior conversion in a suspension directly with the watery silver nitrate solution.

17. Method as in claim 16 wherein the tin II salt solution prior to being combined with the watery silver nitrate solution has a concentration of not more than 0.6 mol tin/liter.

18. Method of claim 1 the tin compounds are being combined with a silver nitrate solution such that dissolving of the silver granules in a 50% nitric solution at 80 degrees C is carried out at a mol ratio of nitric acid to silver of about 1.4:1.

* * * * *